Patented June 13, 1933

1,914,244

UNITED STATES PATENT OFFICE

THOMAS ROBERT DIXON, OF WOODBRIDGE, ENGLAND

MALTING OF CEREALS

No Drawing. Application filed August 20, 1930, Serial No. 476,713, and in Great Britain October 7, 1929.

This invention relates to the malting of cereals, for use in the brewing of beer and the like, the preparation of vinegar, the distillation of spirituous liquors (including the preparation of bakers' yeast), and for similar purposes, and has for its object an improved process of malting with a view of rendering the nitrogenous and carbohydrate matters in the grain more soluble than is the case when the usual malting process is followed, thereby improving their action when used, subsequently, in the mash tun or other vessel in which extract is obtained from the grain.

In the ordinary system of malting, cereals are first steeped in water for a period depending upon their nature, the object being so to charge the grain with moisture as at known temperatures, to encourage the germination and modification of the grain. After steeping, the grain is, in floor malting, thrown out of the steep, and spread out on floors, or in other systems to some other venue where germination starts. The rootlets grow out from the embryo and the acrospire gradually proceeds on its way down the length of the growing corn, breaking through the testa and overlapping skins which cover the endosperm of the grain, and receiving food matters from the grain. With the growth of the acrospire, chemical changes take place which are the result of the action of the enzymes of the grain transforming the starchy matter of the grain into such condition that, when subsequently ground and then treated with water at suitable temperatures, saccharous matters, such as maltose and dextrin are formed, and also the nitrogenous constituents of the grain are rendered more or less readily soluble. During this process of germination and modification, the temperature of the growing grain is regulated usually between 60° F. and 70° F., and a sufficient quantity of moisture is kept in the grain by sprinkling it for the purpose of keeping the growth fresh until such time as the modification process is complete, when the malted grain is removed to a kiln or the like and dried, the heat causing the germination to cease. The ordinary process of malting is not always successful in bringing about a thorough breaking up of either the starchy or the nitrogenous portions of the grain. In accordance with the present invention, the cereal, ungerminated, or during, or after germination, is treated with an acid solution to stimulate and accelerate the action of the enzymes of the grain.

When ungerminated cereal is submitted to acid treatment, the grain must be broken or perforated and then treated with an acid solution having an acidity varying with the type of cereal being treated, but usually of about 20% concentration by weight as indicated by neutralization with normal soda solution using litmus as the indicator. When using lactic acid this corresponds to a concentration of 2.22 gram-molecules per liter. Alternatively the acid treatment may be carried out after germination has taken place, the essential requirement being that the testa and other overlapping skins of the grain must be so perforated either by mechanical means or by the growth of the acrospire that the acid may be brought into direct contact with the endosperm of the grain. Preferably an organic acid, such as lactic or acetic acid is employed for the acid treatment, especially the former, and, although an inorganic acid can be employed, the use of sulphuric acid or hydrochloric acid is not recommended. Poisonous or powerful acids such as prussic acid or nitric acid are definitely unsuitable. The use of lactic acid in the mash tun is known, but the present invention is readily distinguishable from such prior use in that the acid treatment is employed during the malting stage and not during what is really a stage in brewing from previously malted grain.

According to the preferred method of carrying out this invention, the grain is first steeped for a restricted period of about 42 hours, and, after draining off the water, is thrown onto the malting floor or the like and allowed to commence germination, and break the testa of the grain. The growing grain is maintained at a temperature of 56° F. to 60° F. for a time, and is then sprinkled with water which has been acidified with lactic acid to a concentration of about 10% by weight as indicated by neutralization with normal soda solution using litmus as an indicator. When using lactic acid this corresponds to an acid concentration of 1.11 gram-molecules per liter. The sprinkling is given on two alternate days, the first day being that upon which the acrospire is adjudged to have fairly started upon its way (usually the third day including the day out of steep) and each sprinkling is at the rate of about 3 gallons of acid solution to the quarter (448 lbs.) making a total of 6 gallons of acid solution to the quarter. After the second sprinkling the grain is allowed to rise gradually from its previous temperature of 60° F., to a temperature of 80° F., at which it is maintained for not more than 24 hours, the whole operation up to this stage taking 5 to 6 days including the day out of steep.

The process may stop here, the malt being sent to the kiln for drying, but in cases where the extremely high enzymic action obtained up to this point is not required, the grain is next put to steep in an acid solution, similar to that employed for sprinkling, but of about 20% acidity by weight, corresponding to an acid concentration of 2.22 gram-molecules of lactic acid per liter, if lactic acid is the organic acid used. The strength of the solution depends upon the particular type of cereal being treated, grain having a higher carbohydrate content requiring a stronger solution, for example barley would require about 20% acidity by weight (lactic acid concentration 2.22 gram-molecules per liter), whereas wheat, oats and rice would require about 15% acidity by weight (lactic acid concentration 1.66 gram-molecules per liter), and maize would require about 25% acidity by weight (lactic acid concentration 2.77 gram-molecules per liter. The hydrogen ion concentration is regulated as desired (this being dependent on the type of water used in mashing for example an alkaline water would require a higher percentage than other waters not so alkaline), and the grain is allowed to steep for 24 hours at a temperature of 60° F., after which the acid solution is drawn off and the grain is transferred to a kiln or the like where its moisture content is reduced to about 2% by weight. The acidity of the treated material should now be not less than 0.5% by weight and preferably should be 1% by weight corresponding to 5 to 10 times that of ordinary malt.

In an alternative process wherein ungerminated grain is treated with acid solution, the grain is first broken or perforated and is then steeped for a few days in an acid solution of about 20% concentration by weight until it is found by the usual practical and laboratory tests that there has been brought about a state of modification analogous to that produced by other methods in vogue, together with the added enzymic power. A 20% acid concentration by weight corresponds to 2.22 gram-molecules per liter when lactic acid is used as the steeping acid solution. The acid liquor is then drawn off and the treated material transferred to an ordinary malt kiln or other drying apparatus where its moisture content is reduced to about 2% by weight, after which it is stored in a thoroughly dry place until required for use. The dried material should have an acidity of at least 0.5% and preferably 1%, both percentages being by weight.

By the use of cereals malted in accordance with this invention, the process of making malt is accelerated and a better or larger extract can be obtained in the brewery (as compared with cereals malted by the usual method), thus reducing production cost whilst the clarification is quicker and better, the yeast crops are better and more active, and the beer or the like especially, has a better keeping property, condition and flavor. The advantage in connection with the extract clarification and yeast crops apply also in the preparation of vinegar whilst those in connection with the extract and yeast crops apply to the distillation of potable and commercial spirits.

As is well known to maltsters the characteristics of any particular kind of grain vary (for example from one year's crop to another or according to the conditions under which it is grown) and consequently the several temperatures, times, strengths and quantities hereinbefore mentioned are subject to such variations as may be necessitated as shown by tests of the grain to be treated.

I claim:—

1. In a process of malting cereals, steeping the cereal, after the grain has germinated and modified and before any other step in the process, in a solution of an organic acid such as lactic acid for substantially 24 hours at a temperature of substantially 60° F.

2. In a process of malting cereals, steeping the cereal, after the grain has germinated and modified, and before any other step in the process, in a solution of an organic acid such as lactic acid of a strength of substantially 20% by volume, for substantially 24 hours at a temperature of substantially 60° F.

3. A process for malting cereals comprising the following steps in the order given, steeping the grain in water for substantially 42 hours, transferring the grain to the malting floor and allowing it to germinate for substantially 3 days, sprinkling the grain with acid solution of substantially 10% acidity by volume at the rate of substantially 3 gallons per quarter, allowing the grain to continue germination for another two days, sprinkling the grain again in a similar manner, raising the temperature of the grain to 80° F., and maintaining it thereat for 24 hours, steeping the grain for 24 hours at 60° F. in an acid solution of 20% acidity by volume and drying the grain to a moisture content of substantially 2% by volume.

4. A process of malting cereals including the steps of sprinkling the grain with an acid solution of substantially 10% concentration by weight, corresponding to an acid concentration of 1.11 gram-molecules per liter, at the rate of substantially six gallons of acid solution per quarter (448 pounds), germinating and modifying the grain, then steeping the cereal in a solution of organic acid, such as lactic acid, for substantially twenty-four hours at a temperature of substantially 60° F.

5. A process of malting cereals including the steps of sprinkling the grain with an acid solution of substantially 10% concentration by weight which corresponds to an acid concentration of 1.11 gram-molecules per liter, at the rate of substantially six gallons of acid solution per quarter (448 pounds), germinating and modifying the grain, then steeping the cereal in a solution of an organic acid, such as lactic acid, of a concentration of substantially 20% by weight, corresponding to an acid concentration of 2.22 gram-molecules per liter, for substantially 24 hours at a temperature of substantially 60° F.

6. In a process of malting cereals, steeping the cereal, after the grain has germinated and modified and before any other step in the process, in a solution of an organic acid selected from the group which consists of lactic acid and acetic acid, of a concentration of substantially 20% by weight, for substantially twenty-four hours at a temperature of substantially 60° F.

7. In a process of malting cereals, steeping the cereal, after the grain has germinated and modified and before any other step in the process, in a solution of an organic acid of a concentration of substantially 20% by weight, for substantially twenty-four hours at a temperature of substantially 60° F.

8. A process of malting cereals including the steps of sprinkling the grain in an acid solution of substantially 10% concentration by weight, at a rate of substantially six gallons of acid solution per quarter (448 pounds), germinating and modifying the grain, then steeping the cereal in a solution of an organic acid selected from the group which consists of lactic acid and acetic acid for substantially twenty-four hours at a temperature of substantially 60° F.

9. A process of malting cereals including the steps of sprinkling the grain with an acid solution of substantially 10% concentration by weight, at the rate of substantially six gallons of acid solution per quarter (448 pounds), germinating and modifying the grain, then steeping the cereal in a solution of an organic acid for substantially twenty-four hours at a temperature of substantially 60° F.

THOMAS ROBERT DIXON.